US012061863B2

United States Patent
Choi et al.

(10) Patent No.: US 12,061,863 B2
(45) Date of Patent: Aug. 13, 2024

(54) ELECTRONIC DEVICE, AND METHOD FOR PLACING TEXT-LINKED OBJECT IN ELECTRONIC DEVICE

(71) Applicant: SAMSUNG ELECTRONICS CO., LTD., Suwon-si (KR)

(72) Inventors: Eunji Choi, Suwon-si (KR); Yongmin Koo, Suwon-si (KR); Hyungwoo Kim, Suwon-si (KR); Nguyen Bao Trung Tran, Suwon-si (KR); Bongje Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/708,326

(22) Filed: Mar. 30, 2022

(65) Prior Publication Data

US 2022/0343058 A1  Oct. 27, 2022

Related U.S. Application Data

(63) Continuation of application No. PCT/KR2022/002488, filed on Feb. 21, 2022.

(30) Foreign Application Priority Data

Apr. 23, 2021  (KR) .................. 10-2021-0052823

(51) Int. Cl.
*G06F 17/00* (2019.01)
*G06F 40/109* (2020.01)
*G06F 40/166* (2020.01)

(52) U.S. Cl.
CPC .......... *G06F 40/166* (2020.01); *G06F 40/109* (2020.01)

(58) Field of Classification Search
CPC ..... G06F 40/166; G06F 40/109; G06F 40/103
See application file for complete search history.

(56) References Cited

U.S. PATENT DOCUMENTS

| 2005/0097458 A1* | 5/2005 | Wilson | G06F 40/174 |
| | | | 715/252 |
| 2007/0074159 A1* | 3/2007 | Ueno | G06F 40/166 |
| | | | 717/110 |

(Continued)

FOREIGN PATENT DOCUMENTS

| CN | 107230241 A | 10/2017 |
| CN | 111179381 A | 5/2020 |
| CN | 112434487 A | 3/2021 |

(Continued)

OTHER PUBLICATIONS

Li, Hua. "The automatically generated system based on VBA." 2015 International Industrial Informatics and Computer Engineering Conference. Atlantis Press, 2015 (Year: 2015).*

(Continued)

*Primary Examiner* — Andrew T McIntosh
(74) *Attorney, Agent, or Firm* — Nixon & Vanderhye P.C.

(57) ABSTRACT

An electronic device according to various embodiments may include: a memory, a display, and a processor, and the processor may be configured to: based on identification of insertion of a text-linked first object during display of text on the display, convert the first object into a text type, and based on a layout of the text displayed on the display being changed according to editing of the text, control the display to display the first object to a changed position corresponding to the changed layout of the text.

16 Claims, 17 Drawing Sheets

(56) References Cited

U.S. PATENT DOCUMENTS

| | | |
|---|---|---|
| 2008/0273796 A1 | 11/2008 | Kansal et al. |
| 2013/0339907 A1* | 12/2013 | Matas ................ G06F 3/04845 715/853 |
| 2014/0164958 A1* | 6/2014 | Mitchell ................ H04N 7/15 715/753 |
| 2015/0121183 A1* | 4/2015 | Saund ................ G06F 40/103 715/205 |
| 2015/0143289 A1* | 5/2015 | Saraya ................ G06F 3/0482 715/808 |
| 2015/0278163 A1 | 10/2015 | Kinkoh |
| 2015/0324341 A1* | 11/2015 | Bhagwan ............. G06F 40/169 715/231 |
| 2016/0041698 A1* | 2/2016 | Tkach ................ G06F 3/0482 715/765 |
| 2016/0148410 A1* | 5/2016 | DeLuca ............. G06F 3/04845 345/470 |
| 2018/0114059 A1* | 4/2018 | Ric ....................... G06F 17/214 |
| 2020/0218414 A1* | 7/2020 | Matas ..................... H04L 67/52 |
| 2020/0327188 A1* | 10/2020 | Gupta .................. G06F 40/109 |

FOREIGN PATENT DOCUMENTS

| | | |
|---|---|---|
| JP | 2012-068859 | 4/2012 |
| JP | 2015-182356 | 10/2015 |
| JP | 2015-191586 | 11/2015 |
| KR | 10-2018-0127274 | 11/2018 |
| KR | 2020-013235 | 1/2020 |

OTHER PUBLICATIONS

Leporini, Barbara, and Clara Meattini. "Personalization in the Interactive EPUB 3 Reading Experience: Accessibility Issues for Screen Reader Users." Proceedings of the 16th International Web for All Conference. 2019 (Year: 2019).*

Search Report and Written Opinion issued Jun. 3, 2022 in counterpart International Patent Application No. PCT/KR2022/002488.

* cited by examiner

ELECTRONIC DEVICE, AND METHOD FOR PLACING TEXT-LINKED OBJECT IN ELECTRONIC DEVICE

CROSS-REFERENCE TO RELATED APPLICATIONS

This application is a continuation of International Application No. PCT/KR2022/002488 designating the United States, filed on Feb. 21, 2022, in the Korean Intellectual Property Receiving Office and claiming priority to Korean Patent Application No. 10-2021-0052823, filed on Apr. 23, 2021, in the Korean Intellectual Property Office, the disclosures of which are incorporated by reference herein in their entireties.

BACKGROUND

Field

The disclosure relates to an electronic device and a method for placing a text-linked object in the electronic device.

Description of Related Art

When a document is created by a document application in an electronic device, various objects (e.g., images) may be inserted along with a text input.

In the document application, while input text is displayed using a keyboard displayed on a touch screen, a desired object may be inserted through an insert menu.

An object inserted through the insert menu by the document application of the electronic device may be placed in a line in which text is arranged. Text displayed in a specific font size may be displayed in combination with an object having a size independent of the specific font size of the text.

Further, when the text is edited while the text and the object are displayed, the editing of the text is not applied to the object. Therefore, the text and the object may have to be edited separately. For example, when the text is placed in an upper part of a paragraph and the object is placed in a lower part of the paragraph, the relative coordinates of the object are stored based on the paragraph. Accordingly, when an input operation for shifting some text to another line (e.g. an Enter key input) is identified, the text may be shifted to be located below the object, without changing the position of the object.

When the size of the object is larger than an area where the object is to be placed, a part of the object may not be displayed depending on a text layout options (e.g., align, indent, or/and outdent).

SUMMARY

Embodiments of the disclosure provide an electronic device and a method for placing a text-linked object in the electronic device.

An electronic device according to various example embodiments may include: a memory, a display, and a processor, and the processor may be configured to: based on identification of insertion of a text-linked first object during display of text on the display, convert the first object into a text type, and based on a layout of the text displayed on the display being changed according to editing of the text, control the display to display the first object to a changed position corresponding to the changed layout of the text.

A method for placing a text-linked object in an electronic device according to various example embodiments may include: based on identification of insertion of a text-linked first object during display of text on a display of the electronic device, converting the first object into a text type, and based on a layout of the text displayed on the display being changed according to editing of the text, control the display to display the first object to a changed position corresponding to the changed layout of the text.

According to various example embodiments, usability may be improved by facilitating editing of an object and text in a mobile environment in which an editing range is limited due to a small display. In addition, as the problem that an object is partially truncated due to arrangement of the object together with text is addressed by optimizing the size of the object, a user's additional editing may be reduced. An effect applied to the text is equally applied to the object, thereby achieving visual uniformity. Further, the size of the object may be conveniently adjusted by linking the font size of the text to the size of the object.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
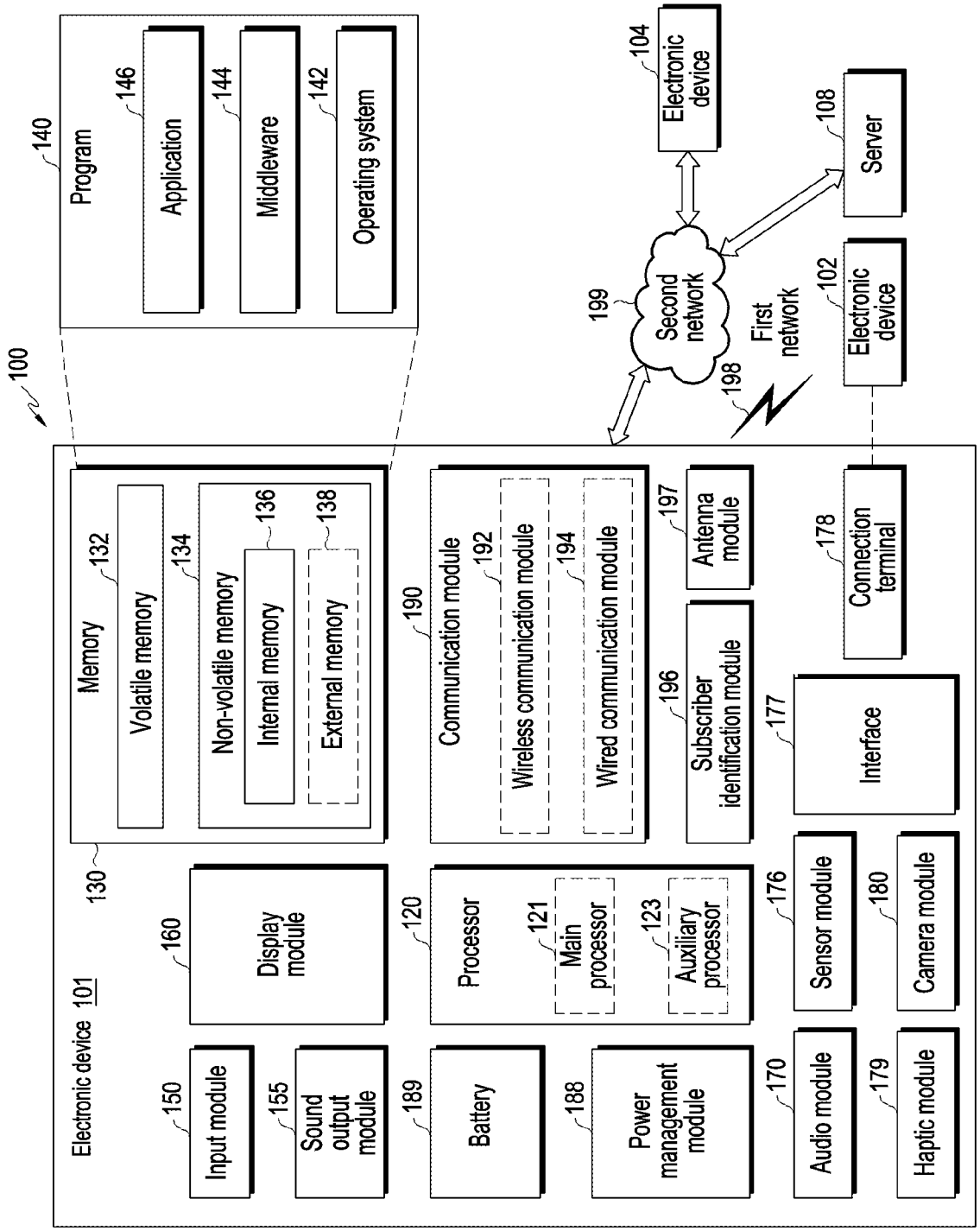
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
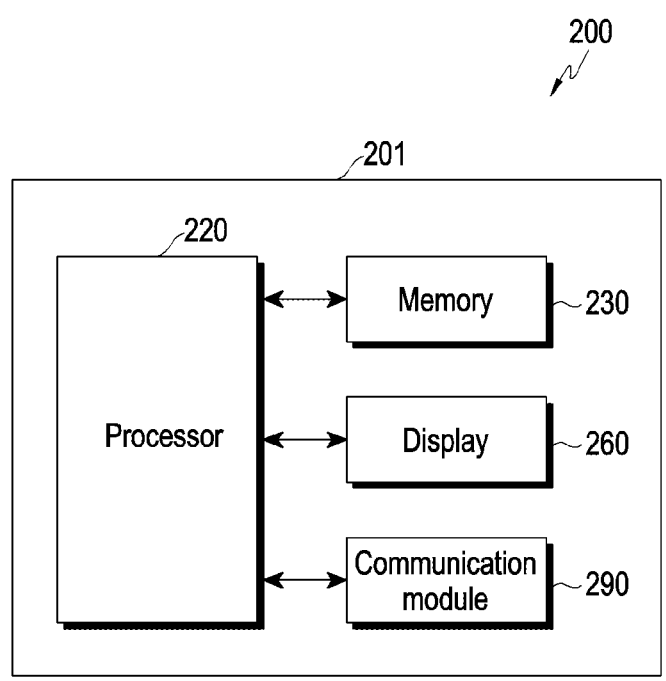
FIG. 2 is a block diagram illustrating an example configuration of an electronic device according to various embodiments.

FIG. 2 is a block diagram 200 illustrating an example configuration of an electronic device according to various embodiments.

Referring to FIG. 2, an electronic device 201 (e.g., the electronic device 101 of FIG. 1) may include a processor (e.g., including processing circuitry) 220, a memory 230, a display 260, and/or a communication module (e.g., including communication circuitry) 290.

According to various embodiments, when the processor 220 (e.g., the processor 120 of FIG. 1) may include various processing circuitry and identifies insertion of a text-linked first object, the processor 220 may convert the first object into a text type and store the converted first object.

According to an embodiment, an object may include data which may be inserted through an insert menu and placed on a page by a document application, or data other than text input through a keyboard displayed on the display 260. For example, the object may include an image and/or a file.

According to an embodiment, when the processor 220 identifies that the first object is inserted into a page corresponding to a second area of the display 260 through the insert menu, while executing the document application and displaying text input through the keyboard displayed in a first area of the display 260 on the page, the processor 220 may convert the first object into the text type and store the converted first object.

According to an embodiment, when the processor 220 is configured to convert every object inserted into a page of the document application into a first object according to a user selection, the processor 220 may identify every object inserted through the insert menu as a first object.

According to an embodiment, when an object is inserted through the insert menu, the processor 220 may provide a "text linking on/off" option. Upon user selection of "text linking on", the processor 220 may identify the inserted object as a first object.

According to an embodiment, when the processor 220 identifies the insertion of the first object, the processor 220 may add an object replacement character unicode character (U+FFFC) to a text index corresponding to the position of a string in which the first object is to be stored in an algorithm, so that the first object is used as the text type.

According to an embodiment, the processor 220 may set the size value of the first object to a specified size value by adding Span of an ObjectSpan type in the algorithm, in order to place the first object as text. ObjectSpan may include a pointer of the text index and a pointer of the first object, and when the first object is placed on the page, the first object may be placed with the specified size value based on the pointer of the text index and the pointer of the first object.

According to various embodiments, when the layout of the text is changed along with editing of the text, the processor 220 (e.g., the processor 120 of FIG. 1) may change the position of the first object to correspond to the changed layout of the text and place the first object at the changed position.

According to an embodiment, when the processor 220 detects editing of the text while displaying the text and the first object on the page, the processor 220 may change the positions of the text and the first object according to the type of the detected text editing (e.g., text insert, text delete, space, or/and line change) and place the text and the first object at the changed positions.

According to an embodiment, when the processor 220 detects editing of the text while displaying the text and the first object on the page, the processor 220 may change the positions of user-selected whole or partial text and the first object according to the type of the detected text editing (e.g., align, outdent, and/or indent) and place the text and the first object at the changed positions.

For example, upon receipt of an input (e.g., an Enter key input) for shifting a part of the text to another line, while placing and displaying the text on the upper part of the page and the first object on the lower part of the page, the processor 220 may shift the partial text and the first object to the lower part of the page.

For example, when identifying selection of "indent" as a layout option for the text, while placing and displaying the text and the first object on the page, the processor 220 may shift user-selected whole or partial text and the first object to the right by leaving as much space as a specified distance from the left empty according to the "indent" option.

For example, when the processor 220 identifies selection of "center align" as a layout option for the text, while placing and displaying the text and the first object on the page, the processor 220 may align user-selected whole or partial text and the first object with the center.

According to an embodiment, the processor 220 may apply editing of the text (e.g., a layout option) on a paragraph basis.

According to an embodiment, the processor 220 may designate one first object as an independent paragraph and apply a layout option to the paragraph.

According to an embodiment, the processor 220 may designate both of the first object and the text as one independent paragraph, and apply a layout option to the paragraph.

For example, while arranging and displaying a first paragraph including text, a second paragraph including a first object, and a third paragraph including text and a first object on a page, the processor 220 may apply "center align" as a layout option only to the third paragraph according to a user selection.

According to various embodiments, when a paragraph option for indicating paragraph division in the text is applied along with editing of the text, the processor 220 may also apply the paragraph option applied to the text to the first object.

According to an embodiment, when a paragraph option (e.g., checkbox, numbering, or/and bullets) for indicating paragraph division in the text is applied while the text and the first object are displayed on the page, the processor 220 may also apply the same paragraph option to the first object.

According to an embodiment, when the paragraph option (e.g., checkbox, numbering, or/and bullets) is applied to user-selected whole or partial text and the first object, while the text and the first object are displayed on the page, the processor 220 may apply the paragraph option to the selected text and the first object.

According to an embodiment, the processor 220 may apply editing of the text (e.g., a layout option or/paragraph option) on a paragraph basis.

According to an embodiment, the processor 220 may designate the first object as one independent paragraph and apply a paragraph option to the paragraph.

According to an embodiment, the processor 220 may designate both of the first object and the text as one independent paragraph, and apply a paragraph option to the paragraph.

For example, when the processor 220 identifies selection of "Show Checkbox" among paragraph options for first to third paragraphs, while arranging and displaying a first paragraph including text, a second paragraph including a first object, and a third paragraph including text and a first object on a page, the processor 220 may display a checkbox in a margin to the left of the beginning of each of the first paragraph, the second paragraph, and the third paragraph. When the checkbox of the first paragraph including the text is selected, the processor 220 may display the checkbox as selected and apply a dimming effect to the first paragraph. When the checkbox of the second paragraph including the first object is selected, the processor 220 may display the checkbox as selected and apply the dimming effect to the second paragraph. When the checkbox of the third paragraph including the text and the first object is selected, the processor 220 may display the checkbox as selected and apply the dimming effect to the third paragraph.

For example, when identifying selection of "numbering" among paragraph options for first to third paragraphs, while arranging and displaying a first paragraph including text, a second paragraph including a first object, and a third paragraph including text and a first object on a page, the processor 220 may display numbers sequentially in a margin to the left of the beginning of the first paragraph, the second paragraph, and the third paragraph.

For example, when identifying selection of "bullets" among paragraph options for first to third paragraphs, while arranging and displaying a first paragraph including text, a second paragraph including a first object, and a third paragraph including text and a first object on a page, the processor 220 may display bullet points in a margin to the left of the beginning of each of the first paragraph, the second paragraph, and the third paragraph.

For example, while arranging and displaying the first paragraph including the text, the second paragraph including the first object, and the third paragraph including the text and the first object on the page, the processor 220 may apply "bullets" as a paragraph option to the third paragraph selected by the user.

For example, while arranging and displaying the first paragraph including the text, the second paragraph including the first object, and the third paragraph including the text and the first object on the page, the processor 220 may apply "center align" as a user-selected layout option to the first paragraph and "checkbox" as a user-selected paragraph option to the third paragraph.

According to various embodiments, the processor 220 (e.g., the processor 120 of FIG. 1) may place one first object in one line.

According to an embodiment, when identifying that a first object is inserted in text arranged on a page, the processor 220 may place only the single first object in one line by applying the width of the first object as the width of one line.

According to an embodiment, even though the width of the first object is smaller than that of the page, when the processor 220 coverts the first object into the text type and place the first object together with the text, the processor 220 may place only the single first object in one line, considering the width of the first object as the page width.

As the processor 220 places only one first object in one line, the processor 220 may prevent or reduce co-existence of text and a first object in a single line, and along with a change in the position of the text arranged above the first object, the processor 220 may shift the first object from the current line to an upper line or a lower line. Although the processor 220 may place the first object in one line, the first object and the text may be included in the same paragraph. Accordingly, the first object may be subject to the same editing (e.g., a layout option and/or a paragraph option) as applied to the text included in the same paragraph.

According to various embodiments, when the first object is larger than an arrangement area in which the first object is to be placed, the processor 220 (e.g., the processor 120 of FIG. 1) may resize the first object and place the resized first object.

According to an embodiment, when the width of the first object is greater than the width of the arrangement area in which the first object is to be placed on the page, the processor 220 may resize the width and height of the first object to a size which allows the first object to be placed in the arrangement area and place the resized first object in the arrangement area.

According to an embodiment, when the height of the first object is greater than the height of the arrangement area in which the first object is to be placed on the page, the processor 220 may identify whether the next page exists. If the next page exists, the processor 220 may place the first object on the next page. If the next page does not exist, the processor 220 may resize the width and height of the first object to a size that allows the first object to be placed in the arrangement area and place the resized first object in the arrangement area.

According to various embodiments, when the font size of the text is changed, the processor 220 (e.g., the processor 120 of FIG. 1) may change the font size of the first object to correspond to the changed font size of the text.

According to an embodiment, when detecting a user-selected change in the font sizes of the text and the first object, the processor 220 may change the font size of the first object together with the font size of the text.

According to an embodiment, upon detection of a user-selected change in the font size of a paragraph, the processor 220 may change the font size of text included in the paragraph, the font size of a first object included in the paragraph, or the font sizes of the text and the first object included in the paragraph.

According to an embodiment, the processor 220 may calculate the size of the first object in terms of a font size and change the size of the first object to correspond to a changed font size by <Equation 1> for calculating the size of the first object in terms of a font size and <Equation 2> for calculating the height of the first object.

Line spacing percent=line height/font size of text

Font size of object=Object height/Line spacing percent       <Equation 1>

Object height=Font size of object*line spacing percent       <Equation 2>

According to various embodiments, the processor 220 (e.g., the processor 120 of FIG. 1) may include a plurality of modules (not shown) for placing text and a text-linked first object.

According to an embodiment, the plurality of modules (e.g., including various processing circuitry and/or executable program instructions) may include a first module (a module that processes data and control views for an object and text), a second module (a module that arranges text), and a third module (a module that configures an object view and a text view). The first module (the module that processes data and controls views for an object and text) may convert text and a text-type first object into data that may be arranged on a page and process the data. The second module (the module that arranges text) may display the text and the text-type first object on the page by processing the first object as a single line. The third module (the module that configures an object view and a text view) may identify a changed layout range of the text and identify whether a text-linked first object is included in the changed layout range of the text, while the text and the first object are arranged on the page. When the third module identifies that the first object is not included in the changed layout range of the text, the third module may arrange and display the changed layout range of the text. When the third module identifies that the first object is included in the changed layout range of the text, the third module may configure a view according to the type of the first object based on the pointer and position of the first object included in the changed layout range of the text, and update the position of the first object.

According to various embodiments, the memory 230 may be implemented to be substantially identical or similar to the memory 130 of FIG. 1.

According to an embodiment, the memory 230 may use a text-linked first object as a text type, and store an algorithm for placing data of the first object as text.

According to various embodiments, the display 260 may be implemented to be substantially identical or similar to the display module 160 of FIG. 1.

According to an embodiment, the display 260 may display text input through a keyboard displayed on the display 260 and a first object input through an insert menu according to execution of a document application.

According to various embodiments, the communication module 290 (e.g., the communication module 190 of FIG. 1) may include various communication circuitry using various communication technologies.

According to an embodiment, the communication module 290 may include a mobile communication module (not shown) or a sub-communication module (not shown) that performs short-range communication with a wireless local area network (WLAN). The communication module 290 may communicate with an external device using at least one antenna (not shown) under the control of the processor 220.

According to an embodiment, the communication module 290 may include at least one of a WLAN module (not shown) or a short-range communication module (not shown), and include a near field communication (NFC) communication module, a ultra-wideband (UWB) communication module, a Bluetooth legacy communication module, and/or a Bluetooth low energy (BLE) communication module, as the short-range communication module.

Figure 3A:
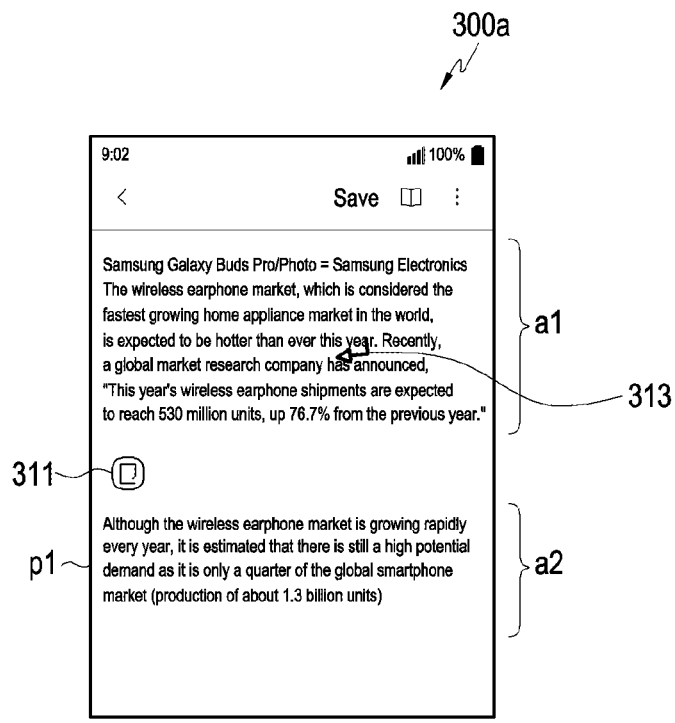
FIGS. 3A and 3B are diagrams illustrating an example of changing the position of a first object along with movement of text in an electronic device according to various embodiments.
Figure 3B:
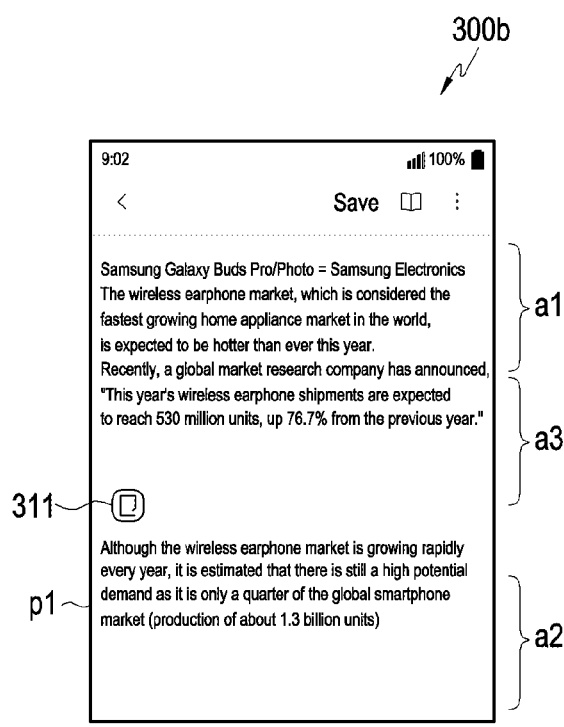

FIGS. 3A and 3B are diagrams 300a and 300b illustrating an example of changing the position of a first object along with movement of text in an electronic device according to various embodiments.

As illustrated in FIG. 3A, the electronic device (e.g., the electronic device 101 of FIG. 1 and/or the electronic device 201 of FIG. 2) may identify an input operation 313 (e.g., an Enter key input) for shifting a part of text a1 to another line, while arranging and displaying text a1 and text a2 and a first object 311 linked to text displayed in one line on a page p1.

As illustrated in FIG. 3B, when identifying the input operation 313 (e.g., the Enter key input) for shifting a part a3 of the text a1 to another line, the electronic device (e.g., the electronic device 101 of FIG. 1 and/or the electronic device 201 of FIG. 2) may change the layout of the text a1, the text a2, and the text a3 and the first object 311, and display the text a1, the text a2, and the text a3 and the first object 311 in the changed layout on the page p1 by shifting the partial text a3 to the next line, shifting the first object 311 below the partial text a3 to the next line, and shifting the text a2 below the first object 311 to the next line.

Figure 4A:
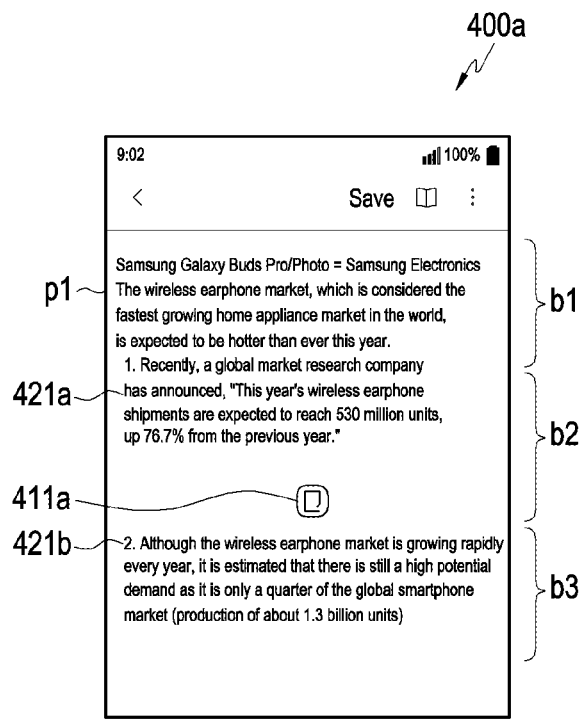
FIGS. 4A and 4B are diagrams illustrating an example operation of applying editing of text to a first object in an electronic device according to various embodiments.
Figure 4B:
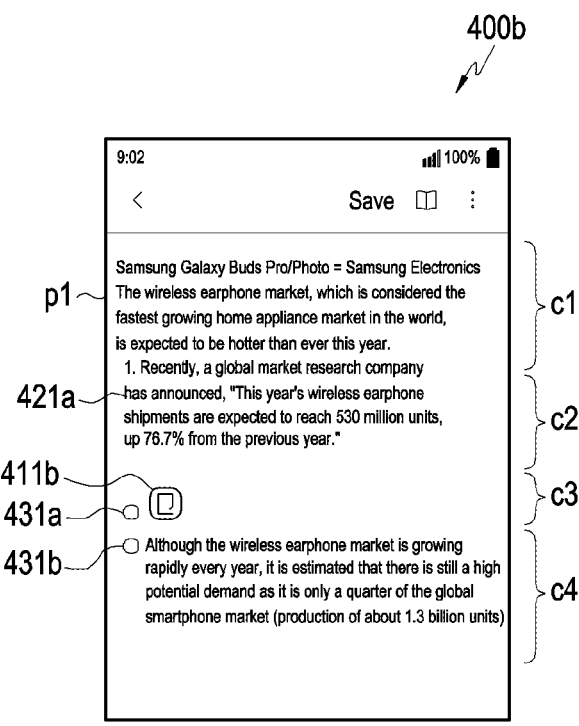

FIGS. 4A and 4B are diagrams 400a and 400b illustrating an example operation of applying editing of text to a first object in an electronic device according to various embodiments.

As illustrated in FIG. 4A, when arranging and displaying a first paragraph b1 including text, a second paragraph b2 including text and a first object 411a, and a third paragraph b3 including text on the page p1, the electronic device (e.g., the electronic device 101 of FIG. 1 and/or the electronic device 201 of FIG. 2) may apply a user-selected layout option, center align among layout options and numbering 421a among paragraph options to the text and the first object 411a in the second paragraph b2. The electronic device may apply a user-selected paragraph option, numbering 421b among the paragraph options to the text in the third paragraph b3.

As illustrated in FIG. 4B, when arranging and displaying a first paragraph c1 including text, a second paragraph c2 including text, a third paragraph c3 including a first object 411b, and a fourth paragraph c4 including text on the page p1, the electronic device (e.g., the electronic device 101 of FIG. 1 and/or the electronic device 201 of FIG. 2) may apply a user-selected layout option, center align, among layout options and numbering 421a, among paragraph options to the text and the first object 411a in the second paragraph c2. The electronic device may apply a user-selected paragraph option, a checkbox 431a among paragraph options to the first object 411b in the third paragraph c3, and a checkbox 431b to the text in the fourth paragraph c4.

Figure 5A:
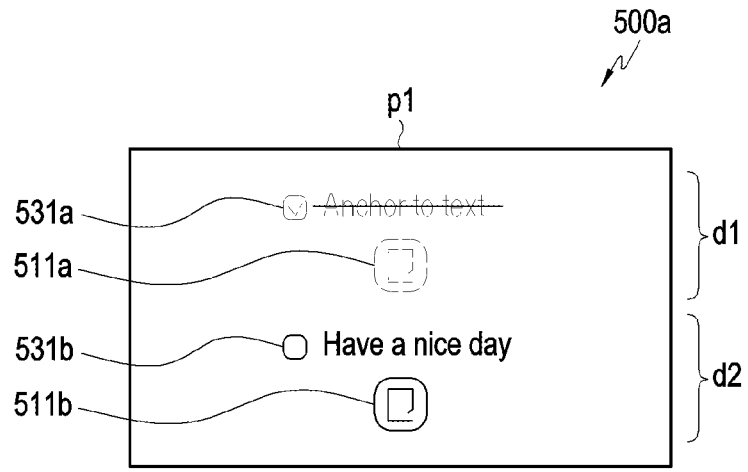
FIGS. 5A and 5B are diagrams illustrating an example operation of applying editing of text to a first object in an electronic device according to various embodiments.
Figure 5B:
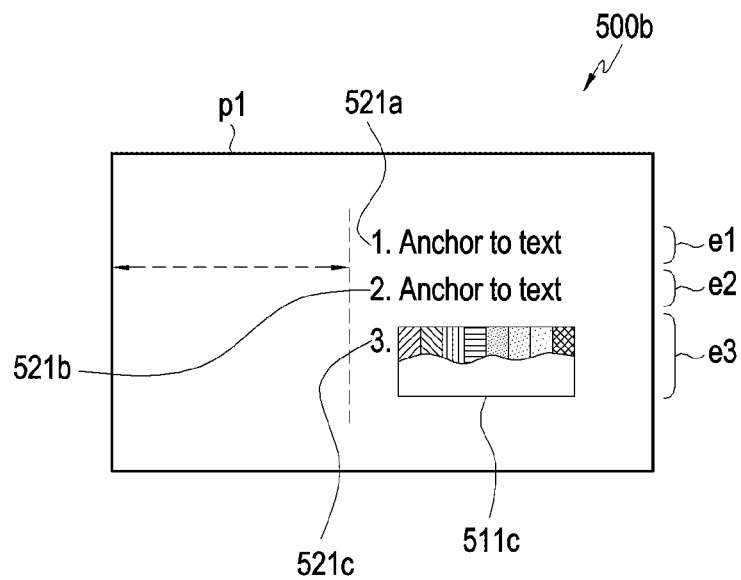

FIGS. 5A and 5B are diagrams 500a and 500b illustrating an example operation of applying editing of text to a first object in an electronic device according to various embodiments.

As illustrated in FIG. 5A, when arranging and displaying a first paragraph d1 including text and a first object 511a and a second paragraph d2 including text and a first object 511b on the page p1, the electronic device (e.g., the electronic device 101 of FIG. 1 and/or the electronic device 201 of FIG. 2) may apply a user-selected layout option, center align, among layout options and checkboxes 531a and 531b among paragraph options to the text and the first object 511a of the first paragraph d1 and the text and the second object 511b of the second paragraph d2. When the checkbox 531a of the first paragraph d1 is selected and the first paragraph d1 is deactivated, the electronic device may apply a dimming effect to the text and the first object 511a included in the first paragraph d1.

As illustrated in FIG. 5B, when arranging and displaying a first paragraph e1 including text, a second paragraph e2 including text, and a third paragraph e3 including a first object 511c on the page p1, the electronic device (e.g., the electronic device 101 of FIG. 1 and/or the electronic device 201 of FIG. 2) may apply a user-selected layout option, indent, among layout options to the first paragraph e1 including the text, the second paragraph e2 including the text, and the third paragraph e3 including the first object 511c, to shift the first paragraph e1, the second paragraph e2, and the third paragraph e3 to the right, with as much space as a specified distance from the left empty. The electronic device may sequentially insert numbers 521a, 521b, and 521c in a margin to the left of the beginning of the first paragraph e1, the second paragraph e2, and the third paragraph e3 by applying a user-selected paragraph option, numbering, among paragraph options to the first paragraph e1 including the text, the second paragraph e2 including the text, and the third paragraph e3 including the first object 511c.

Figure 6A:
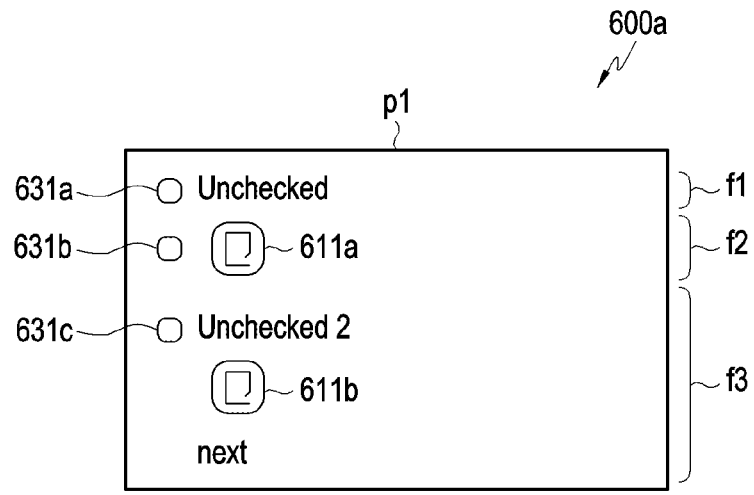
FIGS. 6A and 6B are diagrams illustrating an example operation of applying editing of text to a first object in an electronic device according to various embodiments.
Figure 6B:
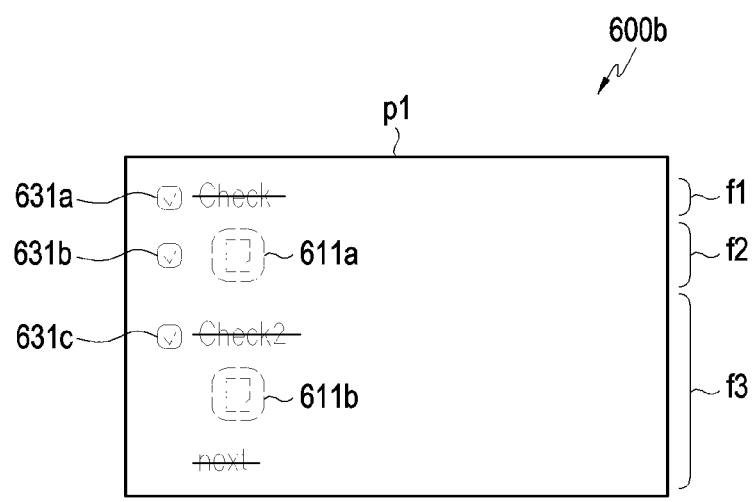

FIGS. 6A and 6B are diagrams 600a and 600b illustrating an example operation of applying editing of text to a first object in an electronic device according to various embodiments.

As illustrated in FIG. 6A, when arranging a first paragraph f1 including text, a second paragraph f2 including a first object 611a, and a third paragraph f3 including text and a first object 611b on the page p1, the electronic device (e.g., the electronic device 101 of FIG. 1 and/or the electronic device 201 of FIG. 2) may display checkboxes 631a, 631b, and 631c in a margin to the left of the beginning of the first paragraph f1, the second paragraph f2, and the third paragraph f3 by applying the checkboxes 631a, 631b, and 631c to the first paragraph f1 including the text, the second paragraph f2 including the first object 611a, and the third paragraph f3 including the text and the first object 611b, respectively.

As illustrated in FIG. 6B, when the checkboxes 631a, 631b, and 631c of the first paragraph f1, the second paragraph f2, and the third paragraph f3 are selected by the user and the first paragraph f1, the second paragraph f2, and the third paragraph f3 are deactivated while the electronic device (e.g., the electronic device 101 of FIG. 1 and/or the electronic device 201 of FIG. 2) is displaying the checkboxes 631a, 631b, and 631c in the margin to the left of the beginning of the first paragraph f1 including the text, the second paragraph f2 including the first object 611a, and the third paragraph f3 including the text and the first object 611b on the page p1, the electronic device may apply a dimming effect to the text included in the first paragraph f1, the first object 611a included in the second paragraph f2, and the text and the first object 611b included in the third paragraph f3.

Figure 7A:
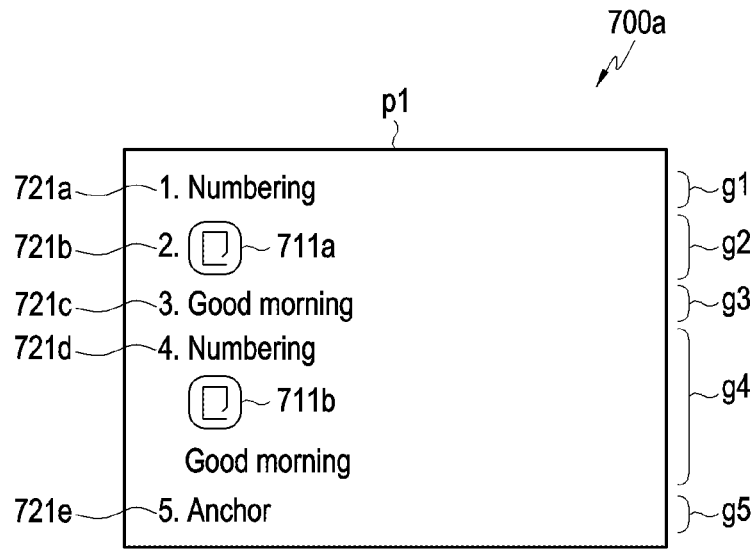
FIGS. 7A and 7B are diagrams illustrating an example operation of applying editing of text to a first object in an electronic device according to various embodiments.
Figure 7B:
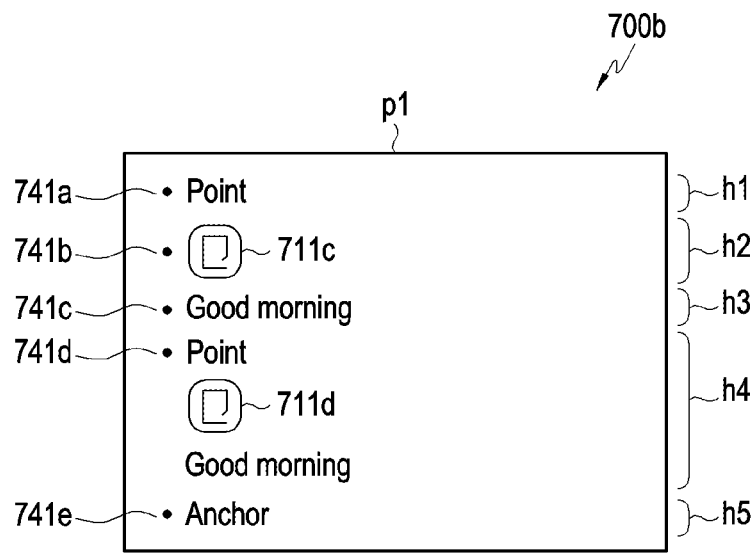

FIGS. 7A and 7B are diagrams 700a and 700b illustrating an example operation of applying editing of text to a first object in an electronic device according to various embodiments.

As illustrated in FIG. 7A, when arranging a first paragraph g1 including text, a second paragraph g2 including a first object 711a, a third paragraph g3 including text, a fourth paragraph g4 including text and a first object 711b, and a fifth paragraph g5 including text on the page p1, the electronic device (e.g., the electronic device 101 of FIG. 1 and/or the electronic device 201 of FIG. 2) may sequentially display numbers 721a, 721b, 721c, 721d, and 721e in a margin to the left of the beginning of the first paragraph g1, the second paragraph g2, the third paragraph g3, the fourth paragraph g4, and the fifth paragraph g5 by applying a user-selected layout option, numbering, among layout options to the first paragraph g1 including the text, the second paragraph g2 including the first object 711a, the third paragraph g3 including the text, the fourth paragraph g4 including the text and the first object 711b, and the fifth paragraph g5 including the text.

As illustrated in FIG. 7B, when arranging a first paragraph h1 including text, a second paragraph h2 including a first object 711c, a third paragraph h3 including text, a fourth paragraph h4 including text and a first object 711d, and a fifth paragraph h5 including text on the page p1, the electronic device (e.g., the electronic device 101 of FIG. 1 and/or the electronic device 201 of FIG. 2) may display bullet points 741a, 741b, 741c, 741d, and 741e in a margin to the left of the beginning of the first paragraph h1, the second paragraph h2, the third paragraph h3, the fourth paragraph h4, and the fifth paragraph h5 by applying a user-selected layout option, bullets, among layout options to the first paragraph h1 including the text, the second paragraph h2 including the first object 711c, the third paragraph h3 including the text, the fourth paragraph h4 including the text and the first object 711d, and the fifth paragraph h5 including the text.

Figure 8A:
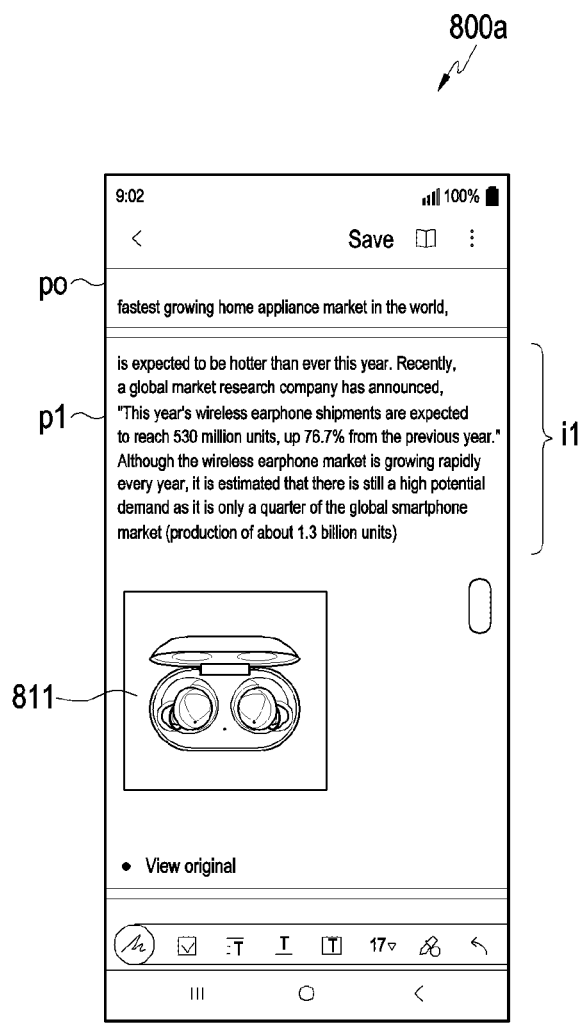
FIGS. 8A and 8B are diagrams illustrating an example of changing the position of a first object along with movement of text in an electronic device according to various embodiments.
Figure 8B:
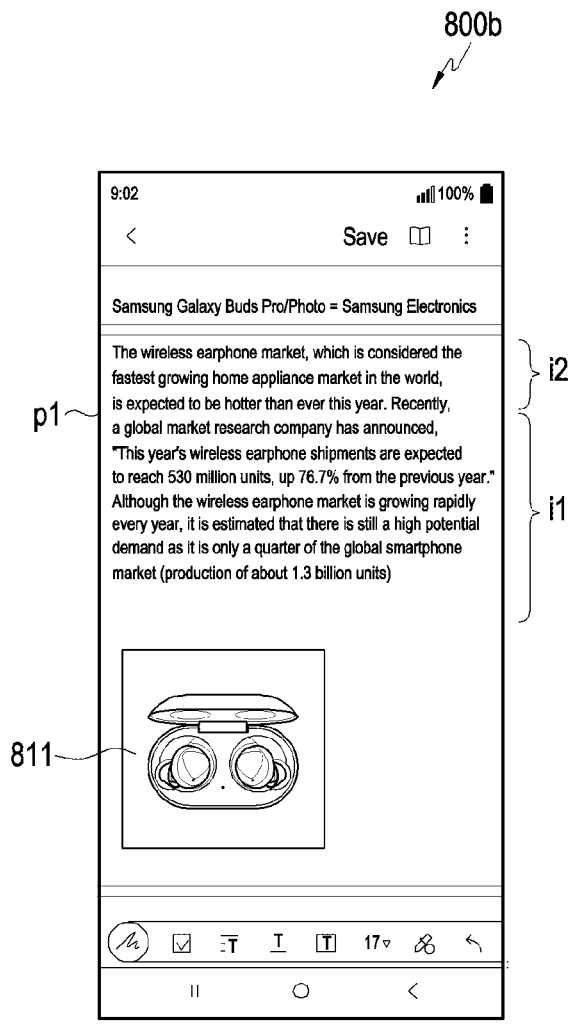

FIGS. 8A and 8B are diagrams 800a and 800b illustrating an example of changing the position of a first object along with movement of text in an electronic device according to various embodiments.

When new text i2 is added above text i1 on the page p1 due to shift of the text i2 from a previous page p0 as illustrated in FIG. 8B, while the text i1 and a first object 811 are arranged and displayed on the page p1 as illustrated in FIG. 8A, the electronic device (e.g., the electronic device 101 of FIG. 1 and/or the electronic device 201 of FIG. 2) may shift down the first object 811 together with the text i1.

Figure 9:
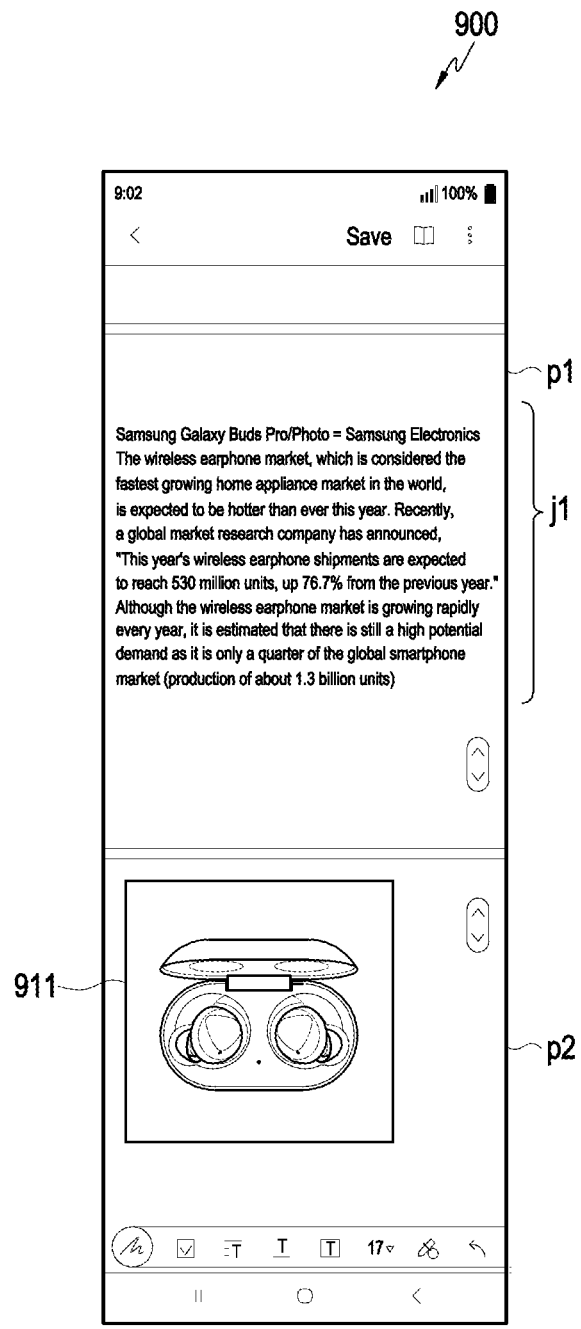
FIG. 9 is a diagram illustrating an example arrangement of a first object in an electronic device according to various embodiments.

FIG. 9 is a diagram 900 illustrating an example arrangement of a first object in an electronic device according to various embodiments.

As illustrated in FIG. 9, when the electronic device (e.g., the electronic device 101 of FIG. 1 and/or the electronic device 201 of FIG. 2) identifies insertion of a first object 911 during display of text j1 on the page p1, if the height of the first object 911 is greater than the height of an arrangement area of the page p1, the electronic device may place the first object 911 on a next page p2.

Figure 10A:
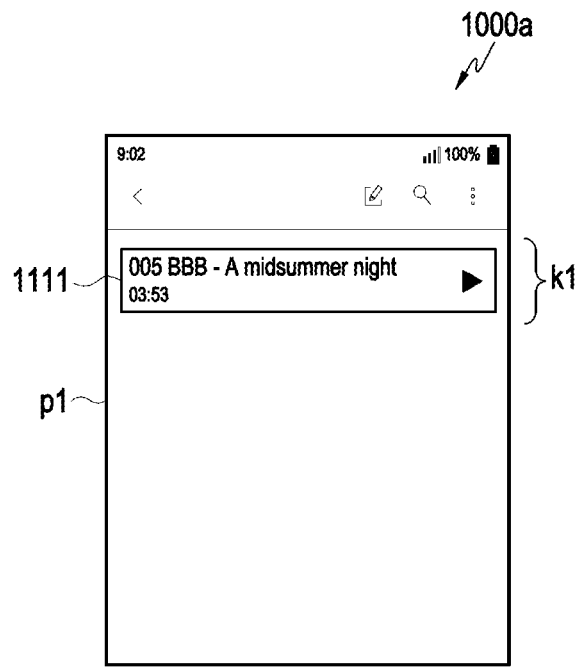
FIGS. 10A, 10B and 10C are diagrams illustrating an example operation of resizing and placing a first object according to editing of text in an electronic device according to various embodiments.
Figure 10B:
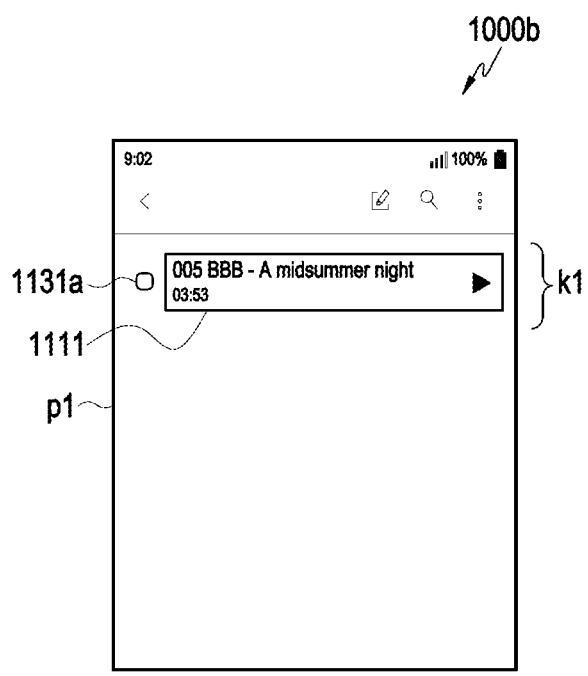
Figure 10C:
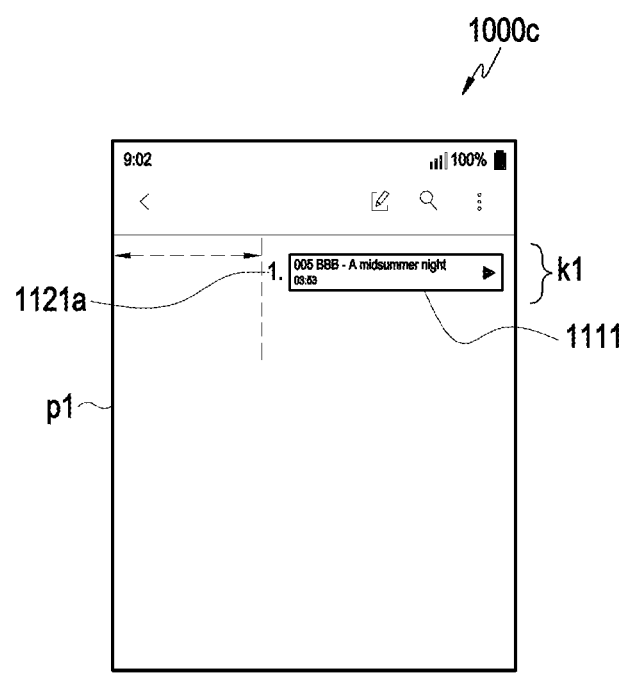

FIGS. 10A, 10B and 10C are diagrams 1000a, 1000b and 1000c illustrating an example operation of resizing and placing a first object along with editing of text in an electronic device according to various embodiments.

When a user-selected paragraph option, checkbox is selected from among paragraph options during arrangement and display of a paragraph k1 including a first object 1111 on the page p1 as illustrated in FIG. 10A, the electronic device (e.g., the electronic device 101 of FIG. 1 and/or the electronic device 201 of FIG. 2) may display a checkbox 1131a in a margin to the left of the beginning of the paragraph k1, as illustrated in FIG. 10B. As the checkbox is displayed in the left margin of the paragraph k1, the width of the first object 1111 is greater than the width of an arrangement area of the first object 1111 on the paragraph k1. Therefore, the electronic device may resize the first object 1111 to correspond to the arrangement area and then display the resized first object 1111.

When a user-selected layout option, indent is selected from among layout options and a user-selected paragraph option, numbering is selected from among paragraph options during arrangement and display of the paragraph k1 including the first object 1111 on the page p1 as illustrated in FIG. 10A, the electronic device (e.g., the electronic device 101 of FIG. 1 and/or the electronic device 201 of FIG. 2) may shift the first object 1111 to the right, leaving as much space as a specified distance from the left empty and display a number 1121a in a margin to the left of the beginning of the first paragraph k1, as illustrated in FIG. 10C. As indent and numbering are applied, the width of the first object 1111 is greater than the width of the arrangement area of the first object 1111 in the paragraph k1. Therefore, the electronic device may resize the first object 1111 to correspond to the arrangement area and then display the resized first object 1111.

According to various example embodiments, an electronic device (e.g., the electronic device 201 of FIG. 2) may include: a memory (e.g., the memory 230 of FIG. 2), a display (e.g., the display 260 of FIG. 2), and a processor (e.g., the processor 220 of FIG. 2). The processor may be configured to: based on identification of insertion of a text-linked first object during display of text on the display, convert the first object into a text type, and based on a layout of the text displayed on the display being changed according to editing of the text, control the display to display the first object to a changed position corresponding to the changed layout of the text.

According to various example embodiments, the processor may be configured to provide an option for converting an inserted object into the text-linked first object.

According to various example embodiments, based on the text being displayed by applying a paragraph option for indicating paragraph division to the text according to the editing of the text, the processor may be configured to display the first object by applying the paragraph option applied to the text to the first object.

According to various example embodiments, the processor may be configured to designate the first object as an independent paragraph or designate the first object and the text as an independent paragraph.

According to various example embodiments, the processor may be configured to apply the text editing on a paragraph basis.

According to various example embodiments, the processor may be configured to display one first object in one line.

According to various example embodiments, wherein based on a width of the first object being greater than a width of an arrangement area of a page displayed on the display based on inserting the first object on the page, the processor is configured to resize the first object to correspond to the width of the arrangement area.

According to various example embodiments, based on a height of the first object being greater than a height of an arrangement area of a page displayed on the display based on inserting the first object on the page, the processor is configured to identify whether a next page exists, and based on the next page existing, place the first object on the next page.

According to various example embodiments, wherein based on the next page not existing, the processor is configured to resize the first object to correspond to the height of the arrangement area.

According to various example embodiments, based on a font size of the text being changed, the processor may be configured to: detect a font size of the first object calculated based on the first object being converted into the text type, and change the font size of the first object to correspond to the changed font size of the text.

Figure 11:
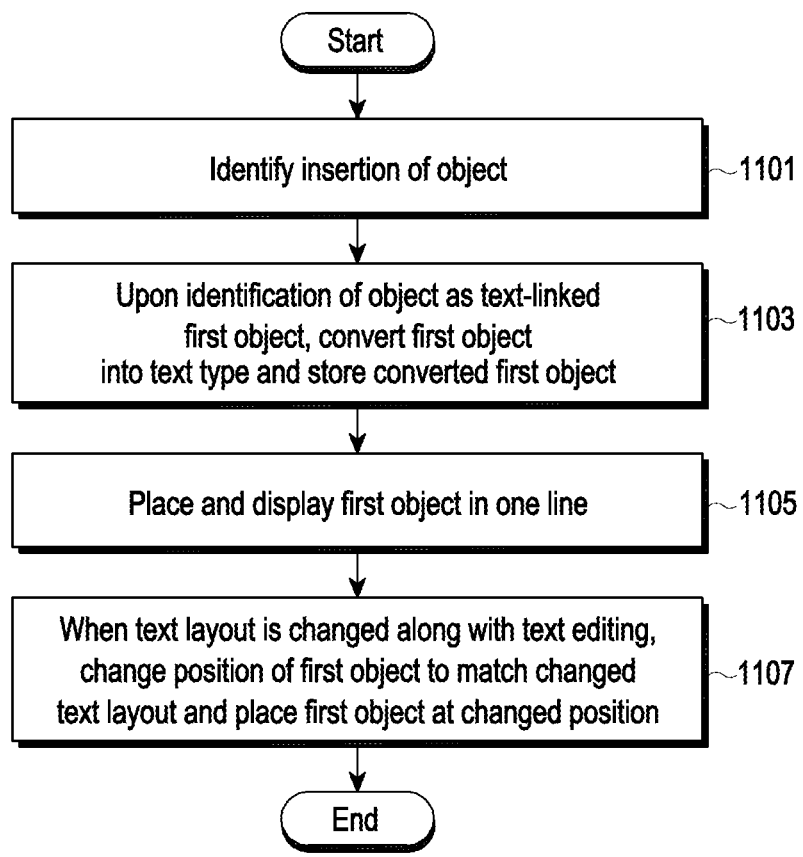
FIG. 11 is a flowchart illustrating an example operation of changing the position of a first object along with movement of text in an electronic device according to various embodiments.

FIG. 11 is a flowchart 1100 illustrating an example operation of changing the position of a first object along with movement of text in an electronic device according to various embodiments. The operation of changing the position of an object may include operation 1101 to operation 1107 (e.g., including operations 1101, 1103, 1105 and 1107). According to an embodiment, at least one of operation 1101 to operation 1107 may be omitted, the order of some operations may be changed, or another operation may be added. The operation of changing the position of an object may be performed by the electronic device 101 of FIG. 1, the processor 120 of FIG. 1, the electronic device 201 of FIG. 2, or the processor 220 of FIG. 2.

In operation 1101, the electronic device 201 may identify that an object has been inserted.

According to an embodiment, the electronic device may identify an object inserted through an insert menu, while executing a document application and displaying text input through a keyboard displayed on a first area of a display (e.g., the display 260 of FIG. 2) on a page corresponding to a second area of the display.

In operation 1103, when identifying the object as a text-linked first object, the electronic device 201 may convert the first object into a text type and store the converted first object.

According to an embodiment, when the electronic device is configured to convert every object inserted in a page of the document application into a first object according to a user selection, the electronic device may identify every object inserted through the insert menu as a first object.

According to an embodiment, when an object is inserted through the insert menu, the electronic device may provide a "text linking on/off" option, and when "text linking on" is selected by the user, identify the inserted object as a first object.

In operation 1105, the electronic device 201 may display the first object by placing the first object in one line.

According to an embodiment, when it is identified that the first object has been inserted in the page with text arranged thereon, the electronic device may place only the single first object in one line by applying the width of the first object as the width of the single line.

According to an embodiment, even though the width of the first object is smaller than that of the page, when converting the first object into the text type and displaying the first object together with the text, the electronic device may arrange the first object and the text, considering the width of the first object to be the width of the page, such that the first object exists only in one line.

In operation 1107, when the layout of the text is changed along with editing of the text, the electronic device 201 may change the position of the first object to correspond to the changed text layout and place the first object at the changed position.

According to an embodiment, upon detection of editing of the text during arrangement and display of the text and the first object on the page, the electronic device may arrange the text and the first object by changing the positions of the text and the first object according to the type of the detected text editing (e.g., text insert, text delete, space, and/or line change).

According to an embodiment, upon detection of editing of the text during arrangement and display of the text and the first object on the page, the electronic device may arrange the text and the first object by changing the positions of user-selected whole or partial text and the first object according to the type of the detected text editing (e.g., a layout option change (e.g., align, outdent, and/or indent).

According to an embodiment, the electronic device may apply the text editing (e.g., layout option) on a paragraph basis. For example, the electronic device may designate one first object as an independent paragraph and apply a layout option to the paragraph, or may designate both of a first object and text as one independent paragraph and apply a layout option to the paragraph.

Figure 12:
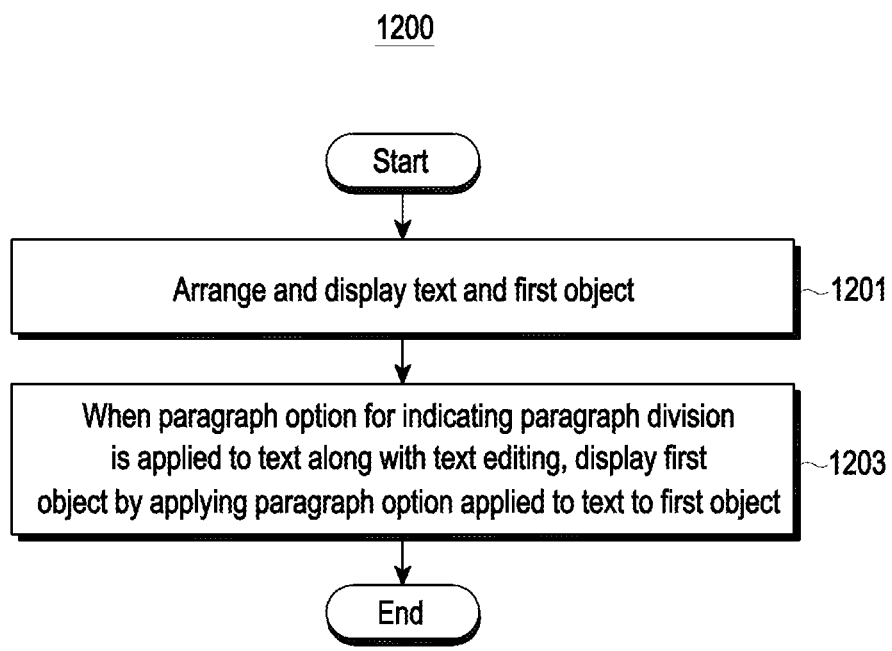
FIG. 12 is a flowchart illustrating an example operation of applying editing of text to a first object in an electronic device according to various embodiments.

FIG. 12 is a flowchart 1200 illustrating an example operation of applying editing of text to a first object in an electronic device according to various embodiments. The operation of applying text editing to a first object may include operations 1201 and 1203. According to an embodiment, at least one of operation 1201 or operation 1203 may be omitted, the order of some operations may be changed, or another operation may be added. The operation of applying text editing to a first object may be performed by the electronic device 101 of FIG. 1, the processor 120 of FIG. 1, the electronic device 201 of FIG. 2, or the processor 220 of FIG. 2.

In operation 1201, the electronic device 201 may arrange and display text and a first object.

According to an embodiment, the electronic device may display a text-linked first object inserted through an insert menu, while executing a document application and displaying text input through a keyboard displayed on a first area of a display (e.g., the display 260 of FIG. 2) on a page corresponding to a second area of the display.

According to an embodiment, when the electronic device is configured to convert every object inserted on a page of the document application into a first object according to a user selection, the electronic device may identify every object inserted through the insert menu as a first object.

According to an embodiment, when an object is inserted through the insert menu, the electronic device may provide a "text linking on/off" option, and when "text linking on" is selected by the user, identify the inserted object as a first object.

According to an embodiment, when identifying the insertion of the first object on the page, the electronic device may convert the first object into a text type and store the converted first object.

In operation 1203, when a paragraph option for indicating paragraph division is applied to the text along with editing of the text, the electronic device 201 may display the text and the first object by applying the paragraph option applied to the text to the first object.

According to an embodiment, when the paragraph option for indicating paragraph division (e.g., checkbox, numbering, and/or bullets) is applied to the text during display of the text and the first object on the page, the electronic device may also apply the same paragraph option to the first object.

According to an embodiment, when the paragraph option (e.g., checkbox, numbering, and/or bullets) is applied to user-selected whole or partial text and the first object during display of the text and the first object on the page, the electronic device may apply the paragraph option to the selected text and the first object.

According to an embodiment, the electronic device may apply the text editing (e.g., a layout option/paragraph option) on a paragraph basis. For example, the electronic device may designate the first object as an independent paragraph and apply a paragraph option to the paragraph, or may designate both of the first object and the text as one independent paragraph and apply a paragraph option to the paragraph.

Figure 13:
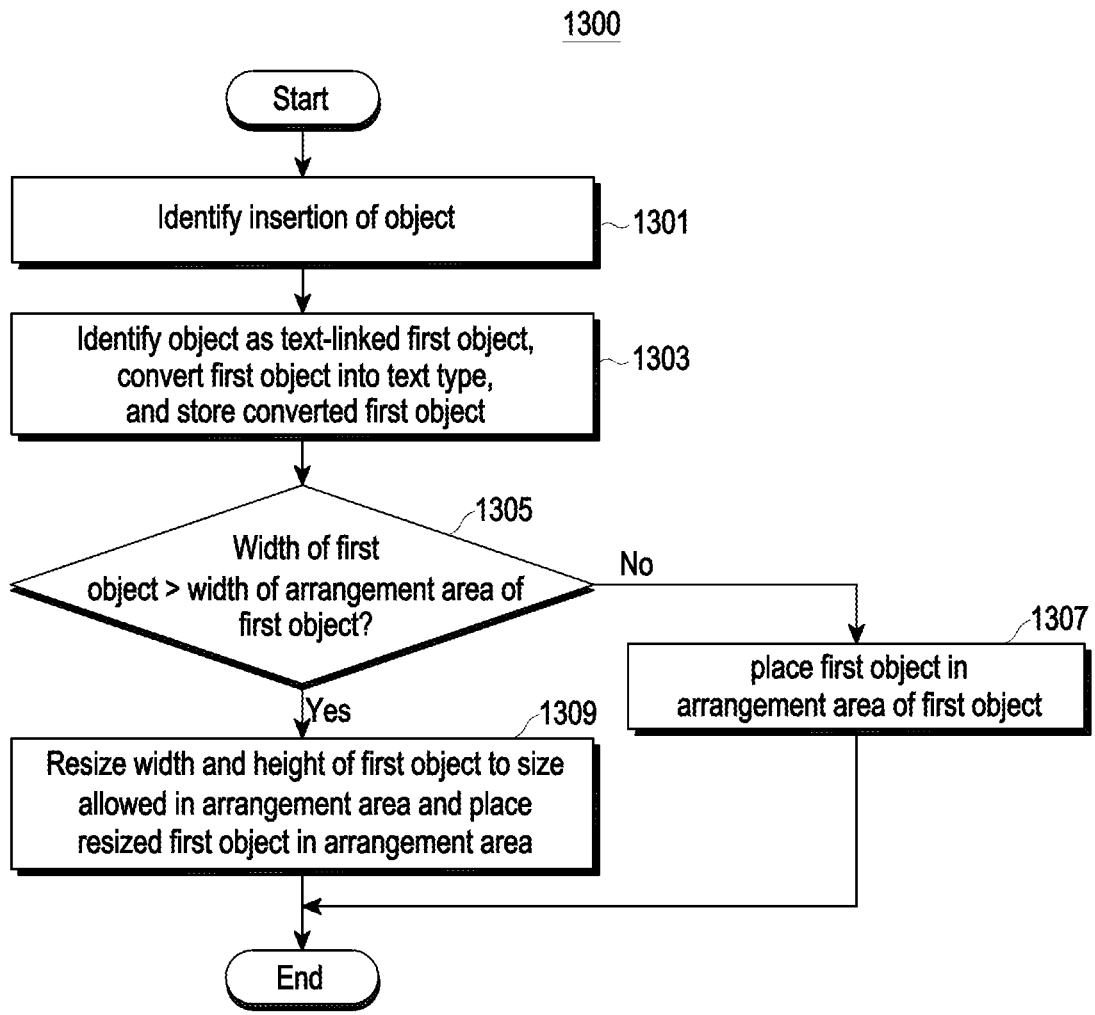
FIG. 13 is a flowchart illustrating an example operation of resizing and placing a first object in an electronic device according to various embodiments.

FIG. 13 is a flowchart 1300 illustrating an example operation of resizing and placing a first object in an electronic device according to various embodiments. The operation of resizing and placing a first object may include operation 1301 to operation 1309 (including operations 1301, 1303, 1305, 1307 and 1309). According to an embodiment, at least one of operations 1301 to 1309 may be omitted, the order of some operations may be changed, or another operation may be added. The operation of resizing and placing a first object may be performed by the electronic device 101 of FIG. 1, the processor 120 of FIG. 1, the electronic device 201 of FIG. 2, or the processor 220 of FIG. 2.

In operation 1301, the electronic device 201 may identify that an object has been inserted.

According to an embodiment, the electronic device may identify an object inserted through an insert menu, while executing a document application and displaying text input through a keyboard displayed on a first area of a display (e.g., the display 260 of FIG. 2) on a page corresponding to a second area of the display.

In operation 1303, when identifying the object as a text-linked first object, the electronic device 201 may convert the first object into a text type and store the converted first object.

According to an embodiment, when the electronic device is configured to convert every object inserted on a page of the document application into a first object according to a user selection, the electronic device may identify every object inserted through the insert menu as a first object.

According to an embodiment, when an object is inserted through the insert menu, the electronic device may provide a "text linking on/off" option, and when "text linking on" is selected by the user, identify the inserted object as a first object.

In operation 1305, the electronic device 201 may compare the width of the first object with the width of an arrangement area in which the first object is to be placed.

When the width of the first object is less than the width of the arrangement area in which the first object is to be placed in operation 1305 (No in operation 1305), the electronic device 201 may place and display the first object in the arrangement area of the first object in operation 1307.

When the width of the first object is greater than the width of the arrangement area in which the first object is to be placed in operation 1305 (Yes in operation 1305), the electronic device 201 may resize the width and height of the first object to a size that allows the first object to be placed in the arrangement area, and place the resized first object in the arrangement area in operation 1309.

Figure 14:
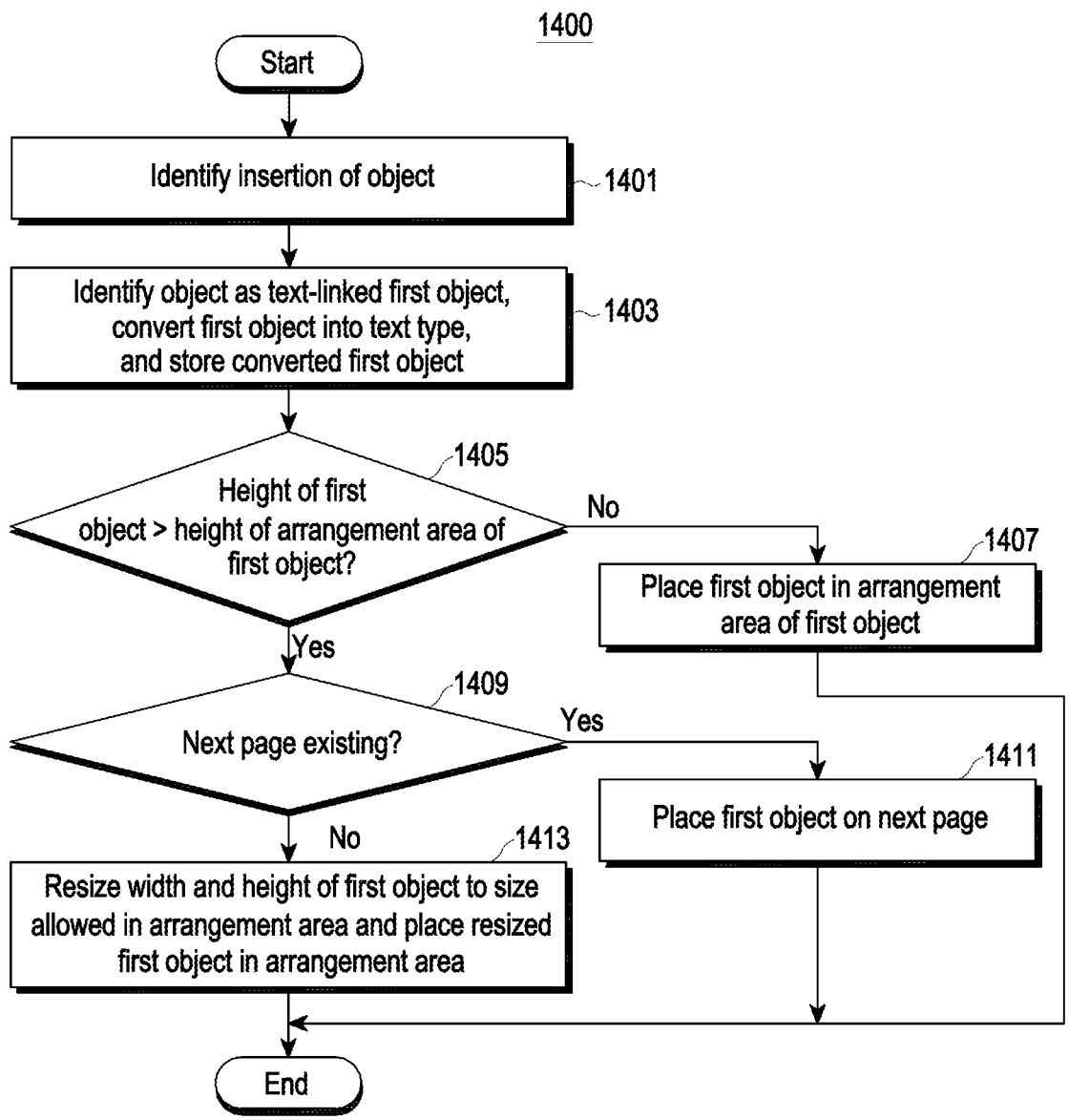
FIG. 14 is a flowchart illustrating an example operation of resizing and placing a first object in an electronic device according to various embodiments.

FIG. 14 is a flowchart 1400 illustrating an example operation of resizing and placing a first object in an electronic device according to various embodiments. The operation of resizing and placing a first object may include operation 1401 to operation 1413 (including operations 1401, 1403, 1405, 1407, 1409, 1411 and 1413). According to an embodiment, at least one of operations 1401 to 1413 may be omitted, the order of some operations may be changed, or another operation may be added. The operation of resizing and placing a first object may be performed by the electronic device 101 of FIG. 1, the processor 120 of FIG. 1, the electronic device 201 of FIG. 2, or the processor 220 of FIG. 2.

In operation 1401, the electronic device 201 may identify that an object has been inserted.

According to an embodiment, the electronic device may identify an object inserted through an insert menu, while executing a document application and displaying text inputted through a keyboard displayed on a first area of a display (e.g., the display 260 of FIG. 2) on a page corresponding to a second area of the display.

In operation 1403, when identifying the object as a text-linked first object, the electronic device 201 may convert the first object into a text type and store the converted first object.

According to an embodiment, when the electronic device is configured to convert every object inserted on a page of the document application into a first object according to a user selection, the electronic device may identify every object inserted through the insert menu as a first object.

According to an embodiment, when an object is inserted through the insert menu, the electronic device may provide a "text linking on/off" option, and when "text linking on" is selected by the user, identify the inserted object as a first object.

In operation 1405, the electronic device 201 may compare the height of the first object with the height of an arrangement area in which the first object is to be placed.

When the height of the first object is less than the height of the arrangement area in which the first object is to be placed in operation 1405 (No in operation 1405), the electronic device 201 may place and display the first object in the arrangement area of the first object in operation 1407.

When the height of the first object is greater than the height of the arrangement area in which the first object is to be placed in operation 1405 (Yes in operation 1405), the electronic device 201 may identify whether a next page exists in operation 1409.

When identifying the existence of the next page in operation 1409 (Yes in operation 1409), the electronic device 201 may place and display the first object on the next page in operation 1411.

When not identifying the existence of the next page in operation 1409 (No in operation 1409), the electronic device 201 may resize the width and height of the first object to a size that allows the first object to be placed in the arrangement area and place the resized first object in the arrangement area in operation 1413.

Figure 15:
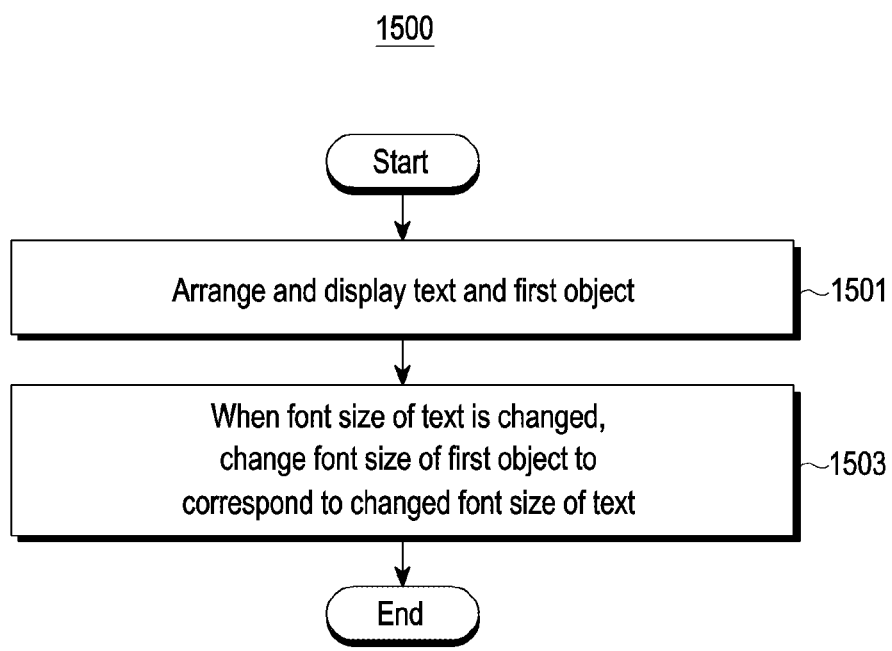
FIG. 15 is a flowchart illustrating an example operation of changing the font size of a first object in an electronic device according to various embodiments.

FIG. 15 is a flowchart 1500 illustrating an example operation of changing the font size of a first object in an electronic device according to various embodiments. The operation of changing the font size of a first object may include operation 1501 and operation 1503. According to an embodiment, at least one of operation 1501 or operation 1503 may be omitted, the order of some operations may be changed, or another operation may be added. The operation of changing the font size of a first object may be performed by the electronic device 101 of FIG. 1, the processor 120 of FIG. 1, the electronic device 201 of FIG. 2, or the processor 220 of FIG. 2.

In operation 1501, the electronic device 201 may arrange and display text and a first object.

According to an embodiment, the electronic device may display a text-linked first object inserted through an insert menu, while executing a document application and displaying text inputted through a keyboard displayed on a first area of a display (e.g., the display 260 of FIG. 2) on a page corresponding to a second area of the display.

According to an embodiment, when the electronic device is configured to convert every object inserted on a page of the document application into a first object according to a user selection, the electronic device may identify every object inserted through the insert menu as a first object.

According to an embodiment, when an object is inserted through the insert menu, the electronic device may provide a "text linking on/off" option, and when "text linking on" is selected by the user, identify the inserted object as a first object.

According to an embodiment, when identifying insertion of the first object in the page, the electronic device may convert the first object into a text type and store the converted first object.

In operation 1503, when the font size of the text is changed, the electronic device 201 may change the font size of the first object to correspond to the changed font size of the text.

According to an embodiment, upon detection of a change in the font sizes of user-selected text and the first object, the electronic device may change the font size of the first object together with the font size of the text.

According to an embodiment, upon detection of a change of a font size in a user-selected paragraph, the electronic device may change the font size of text included in the paragraph, the font size of a first object included in the paragraph, or the font sizes of the text and the first object included in the paragraph.

According to an embodiment, the electronic device may calculate the size of the first object in terms of a font size and change the size of the first object to correspond to a changed font size by <Equation 1> for calculating the size of the first object in terms of a font size and <Equation 2> for calculating the height of the first object.

According to various example embodiments, a method for placing a text-linked object in an electronic device may include: based on identification of insertion of a text-linked first object during display of text on a display of the electronic device, converting the first object into a text type, and based on a layout of the text displayed on the display being changed according to editing of the text, control the display to display the first object to a changed position corresponding to the changed layout of the text.

According to various example embodiments, the method may further include providing an option for converting an inserted object into the text-linked first object.

According to various example embodiments, the method may further include, based on the text being displayed by applying a paragraph option for indicating paragraph division to the text according to the editing of the text, displaying the first object by applying the paragraph option applied to the text to the first object.

According to various example embodiments, the method may further include designating the first object as an independent paragraph or designating the first object and the text as an independent paragraph.

According to various example embodiments, the method may further include applying the text editing on a paragraph basis.

According to various example embodiments, the method may further include displaying one first object in one line.

According to various example embodiments, the method may further include, based on a width of the first object being greater than a width of an arrangement area of a page displayed on the display based on inserting the first object on the page, resizing the first object to correspond to the width of the arrangement area According to various example embodiments, the method may further include, based on a height of the first object being greater than a height of an arrangement area of a page displayed on the display based on inserting the first object on the page, identifying whether a next page exists, and based on the next page existing, placing the first object on the next page.

According to various example embodiments, the method may further include, based on the next page not existing, placing the first object by resizing the first object to correspond to the height of the arrangement area.

According to various example embodiments, the method may further include, based on a font size of the text being changed, detecting a font size of the first object calculated based on the first object being converted into the text type, and changing the font size of the first object to correspond to the changed font size of the text.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the 'non-transitory' storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    a display;
    memory storing instructions; and
    a processor,
    wherein the instructions are configured to, when executed by the processor, cause the electronic device to:
    based on identification of insertion of a text-linked first object during display of text on the display, convert the first object into a text type, and
    based on a layout of the text displayed on the display being changed according to editing of the text, control the display to display the first object to a changed position corresponding to the changed layout of the text;
    determine a font size of the first object based on a height of the first object and a font size of the text;
    based on the font size of the text being changed, change the font size of the first object to correspond to the changed font size of the text, wherein changing the font size of the first object changes the height of the first object;
    based on a check box for indicating paragraph division being applied to the text according to the editing of the text, display the check box in a margin to a left of a beginning of a paragraph including the text and the first object; and
    based on the check box being deactivated by an input, apply a dimming effect to the text and the first object.

2. The electronic device of claim 1, wherein the instructions are further configured to, when executed by the processor, cause the electronic device to provide an option for converting an inserted object into the text-linked first object.

3. The electronic device of claim 1, wherein the instructions are further configured to, when executed by the processor, cause the electronic device to apply the text editing on a paragraph basis.

4. The electronic device of claim 1, wherein the instructions are further configured to, when executed by the processor, cause the electronic device to display one first object in one line.

5. The electronic device of claim 1, wherein the instructions are further configured to, when executed by the processor cause the electronic device to, based on a width of the first object being greater than a width of an arrangement area of a page based on inserting the first object on the page, resize the first object to correspond to the width of the arrangement area.

6. The electronic device of claim 1, wherein the instructions are further configured to, when executed by the processor, cause the electronic device to, based on a height of the first object being greater than a height of an arrangement area of a page displayed on the display based on inserting the first object on the page, identify whether a next page exists, and based on the next page existing, place the first object on the next page.

7. The electronic device of claim 6, wherein the instructions are further configured to, when executed by the processor, cause the electronic device to, based on the next page not existing, resize the first object to correspond to the height of the arrangement area.

8. The electronic device of claim 1, wherein the font size of the first object is determined based on a ratio of the object height to a percentage the font size of the text in a line height.

9. A method for placing a text-linked object in an electronic device, the method comprising:
    based on identification of insertion of a text-linked first object during display of text on a display of the electronic device, converting the first object into a text type;
    based on a layout of the text displayed on the display being changed according to editing of the text, controlling the display to display the first object to a changed position corresponding to the changed layout of the text;
    determining a font size of the first object based on a height of the first object and a font size of the text;
    based on the font size of the text being changed, changing the font size of the first object to correspond to the changed font size of the text, wherein changing the font size of the first object changes the height of the first object;
    based on a check box for indicating paragraph division being applied to the text according to the editing of the text, displaying the check box in a margin to a left of a beginning of a paragraph including the text and the first object; and
    based on the check box being deactivated by an input, applying a dimming effect to the text and the first object.

10. The method of claim 9, further comprising providing an option for converting an inserted object into the text-linked first object.

11. The method of claim 9, further comprising applying the text editing on a paragraph basis.

12. The method of claim 9, further comprising displaying one first object in one line.

13. The method of claim 9, further comprising, based on a width of the first object being greater than a width of an arrangement area of a page displayed on the display based on inserting the first object on the page, resizing the first object to correspond to the width of the arrangement area.

14. The method of claim 9, further comprising:
    based on a height of the first object being greater than a height of an arrangement area of a page displayed on the display based on inserting the first object on the page, identifying whether a next page exists; and
    based on the next page existing, placing the first object on the next page.

15. The method of claim 14, further comprising, based on the next page not existing, placing the first object by resizing the first object to correspond to the height of the arrangement area.

16. The method of claim 9, wherein the font size of the first object is determined based on a ratio of the object height to a percentage the font size of the text in a line height.

\* \* \* \* \*